US008456262B2

(12) United States Patent
Kondo

(10) Patent No.: US 8,456,262 B2
(45) Date of Patent: Jun. 4, 2013

(54) ELECTROMAGNETIC SOLENOID

(75) Inventor: Jiro Kondo, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/396,620

(22) Filed: Feb. 15, 2012

(65) Prior Publication Data
US 2012/0212309 A1 Aug. 23, 2012

(30) Foreign Application Priority Data

Feb. 17, 2011 (JP) .................................. 2011-031527
Dec. 9, 2011 (JP) .................................. 2011-270025

(51) Int. Cl.
*H01F 7/08* (2006.01)
(52) U.S. Cl.
USPC .......................................... 335/220; 335/281
(58) Field of Classification Search
USPC . 335/220–229, 287, 291; 251/129.01–129.22
See application file for complete search history.

(56) References Cited

U.S. PATENT DOCUMENTS

| 5,460,146 A * | 10/1995 | Frankenberg ............ 123/568.21 |
| 5,687,698 A * | 11/1997 | Mastro et al. ............ 123/568.26 |
| 5,960,776 A * | 10/1999 | Everingham et al. ..... 123/568.26 |
| 5,988,147 A * | 11/1999 | Everingham ............. 123/568.18 |
| 2004/0089832 A1 | 5/2004 | Wilde et al. |
| 2005/0062005 A1 | 3/2005 | Shimura et al. |
| 2005/0201867 A1 | 9/2005 | Hirota |

FOREIGN PATENT DOCUMENTS

JP 2004-301294 10/2004
JP 2010-255617 11/2010

OTHER PUBLICATIONS

Office Action (1 page) dated Mar. 26, 2013, issued in corresponding Japanese Application No. 2011-270025 and English translation (2 pages).

* cited by examiner

*Primary Examiner* — Bernard Rojas
(74) *Attorney, Agent, or Firm* — Nixon & Vanderhye PC

(57) ABSTRACT

An electromagnetic solenoid includes first and second stators arranged at two axial end sides of a coil. The first stator includes an annular radial core part, an axial core part cylindrically extending from an inner end of the radial core part toward the second stator, and a core corner part having an outer corner surface at an intersection of the radial and axial core parts. A plunger guide includes a cylindrical sleeve inward of the stators, a flange extending radially outward from the sleeve along a side of the radial core part opposed to the coil, and a plunger-guide corner part having an inner corner surface at an intersection of the sleeve and the flange. The outer and inner corner surfaces of the core corner part and the plunger-guide corner part abut on each other in a contact portion linearly or in area along an entire circumference.

7 Claims, 4 Drawing Sheets

ELECTROMAGNETIC SOLENOID

CROSS REFERENCE TO RELATED APPLICATION

This application is based on and incorporates herein by reference Japanese Patent Applications No. 2011-031527 filed on Feb. 17, 2011 and No. 2011-270025 filed on Dec. 9, 2011.

TECHNICAL FIELD

The present disclosure relates to an electromagnetic solenoid which drives a plunger in an axial direction of the electromagnetic solenoid by utilizing attraction force of an electromagnet generated by energization of a coil.

BACKGROUND

Conventionally, Patent Document 1 (Japanese Patent No. 4214964 corresponding to US 2005/0062005A) discloses regarding an electromagnetic valve. As shown in FIG. 8, the electromagnetic valve includes a yoke 100, a stator 110, a cylindrical cup guide 120, and a magnetism transfer member 140. The yoke 100 is arranged radially outward of a coil (not shown) to form a magnetic circuit, and the stator 110 is magnetized by energization of the coil to attract a plunger (not shown). The cup guide 120 is fitted to an inner circumference of the stator 110 and holds an outer circumference of the plunger slidably. The magnetism transfer member 140 is arranged between a step 130 provided in the yoke 100 and the stator 110 in an axial direction of the electromagnetic valve, and is used for transfer of magnetism between the yoke 100 and the stator 110. An outer circumferential surface of the cup guide 120 and an inner circumferential surface of the stator 110 define an inner circumferential gap β in a radial direction, and an inner circumferential surface of the yoke 100 and an outer circumferential surface of the stator 110 define an outer circumferential gap α in the radial direction. The outer circumferential gap α is larger than the inner circumferential gap β in the radial direction of the electromagnetic valve.

In the configuration in which the outer circumference of the plunger is slidably held by the cylindrical cup guide 120, the cup guide 120 is required to prevent from deforming. Thus, the cup guide 120 cannot be press-fitted and attached to the inner circumference of the stator 110 when the cup guide 120 is inserted radially inward of the stator 110. In other words, it is necessary for the inner circumferential gap β to be provided between the inner circumferential surface of the stator 110 and the outer circumferential surface of the cup guide 120 in order to insert the cup guide 120 radially inward of the stator 110.

In the above-described arrangement, a misalignment of the stator 110 and the plunger becomes large by the inner circumferential gap β, so that side force acting on the plunger, which is attraction force acting in its radial direction, increases. As a result, sliding friction generated between the cup guide 120 and the plunger increases when the plunger moves. Therefore, smooth moving of the plunger is limited, and abrasion between a sliding surface of the cup guide 120 and a sliding surface of the plunger may be increased.

SUMMARY

The present disclosure addresses at least one of the above disadvantages.

According to an aspect of the present disclosure, an electromagnetic solenoid includes a coil, a cylindrical yoke, first and second stators, a plunger guide, and a plunger. The coil generates magnetic force by energization, and the yoke covers an outer circumference of the coil and extends in an axial direction of the coil. The first and second stators are arranged around the coil to configure a magnetic circuit around the coil together with the yoke, and the first and second stators are magnetized by the energization of the coil to configure an electromagnet. The plunger guide is arranged radially inward of the first and second stators. The plunger is inserted into the plunger guide to be slidably movable in the axial direction of the coil and to be attracted by magnetic force of the electromagnet. The first stator is arranged at one end side of the coil in the axial direction of the coil, and the second stator is arranged at the other end side of the coil in the axial direction of the coil. The first stator includes an annular radial core part arranged perpendicularly to the axial direction of the coil and extending in a radial direction of the coil, an axial core part cylindrically extending from an inner diametrical end of the radial core part toward the second stator at a position radially inward of the coil, and a core corner part provided at an intersection portion of the radial core part and the axial core part to have an outer corner surface. The plunger guide includes a cylindrical sleeve which is arranged radially inward of the first and second stators and extends in the axial direction of the coil to hold the plunger slidably, a flange which extends radially outward from an end part of the cylindrical sleeve and is located at a side of the radial core part of the first stator opposed to the coil in the axial direction of the coil, and a plunger-guide corner part provided at an intersection portion of the cylindrical sleeve and the flange to have an inner corner surface. The outer corner surface of the core corner part and the inner corner surface of the plunger-guide corner part abut on each other in a circular contact portion linearly or in area along an entire circumference.

BRIEF DESCRIPTION OF THE DRAWINGS

The disclosure, together with additional objectives, features and advantages thereof, will be best understood from the following description, the appended claims and the accompanying drawings in which:

DETAILED DESCRIPTION

Figure 1:
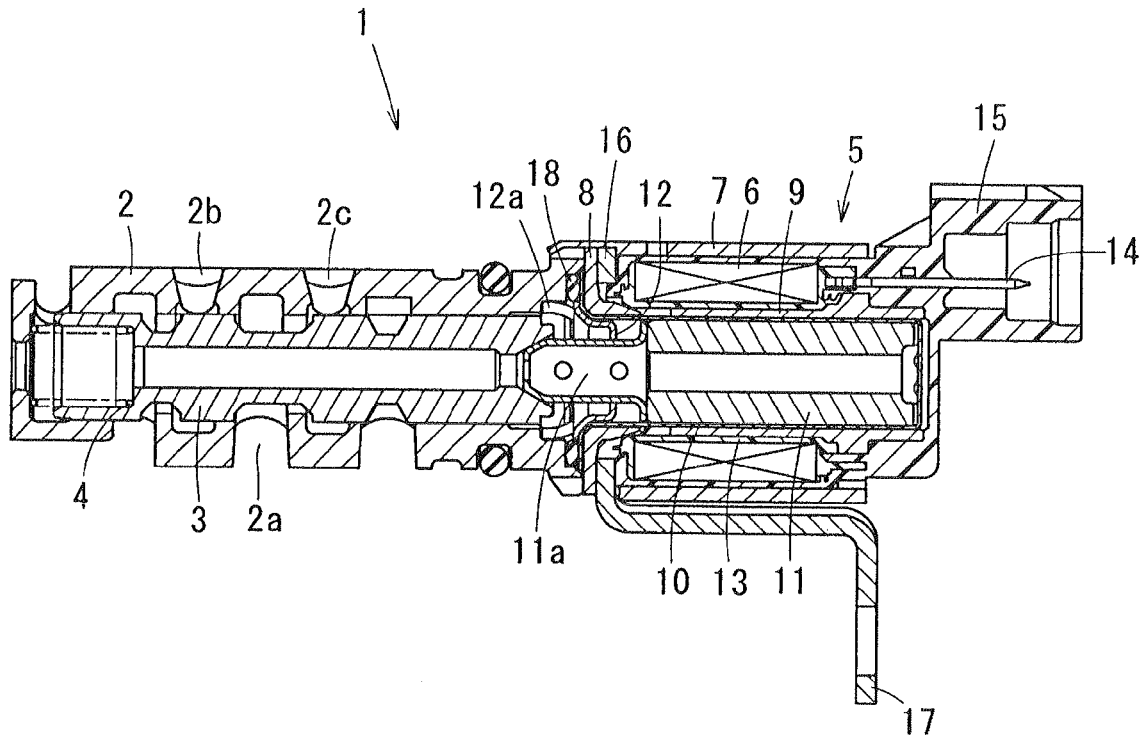
FIG. 1 is a sectional view showing a hydraulic control valve according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

In a first embodiment, an electromagnetic solenoid 5 of the present disclosure will be described in reference to FIGS. 1 and 2. The electromagnetic solenoid 5 is typically used for a hydraulic control valve 1 utilized for a valve timing adjusting device of an internal combustion engine. The valve timing adjusting device includes a hydraulic driving portion (not shown) and the hydraulic control valve 1. The hydraulic driving portion changes a phase difference between a camshaft and a crankshaft of the internal combustion engine to advance or retard valve timing. The hydraulic control valve 1 controls supply and discharge of operating oil to the hydraulic driving portion. As shown in FIG. 1, the hydraulic control valve 1 includes a sleeve bolt 2 which defines a cylindrical sliding hole radially inward of the sleeve bolt 2, a spool 3 accommodated in the sliding hole of the sleeve bolt 2, a coil spring 4 which urges the spool 3 in one direction (in a right direction in FIG. 1), and an actuator which drives the spool 3 in the other direction against the urging force of the coil spring 4. The electromagnetic solenoid 5 of the disclosure is used as an example of the actuator.

The sleeve bolt 2 has various ports connected to an external oil passage. The ports includes, for example, a supply port 2a through which operating oil is supplied to the sleeve bolt 2, a phase advance port 2b connected to a phase advance chamber of the hydraulic driving portion, and a phase retard port 2c connected to a phase retard chamber of the hydraulic driving portion. The spool 3 is movable in an axial direction of the sliding hole of the sleeve bolt 2 between a phase advance position, where the phase advance port 2b communicates with the supply port 2a, and a phase retard position, where the phase retard port 2c communicates with the supply port 2a. When the spool 3 moves to the phase advance position where the supply port 2a communicates with the phase advance port 2b, operating oil is supplied to the phase advance chamber of the hydraulic driving portion through the hydraulic control valve 1 by a hydraulic pump. When the spool 3 moves to the phase retard position where the supply port 2a communicates with the phase retard port 2c, operating oil is supplied to the phase retard chamber of the hydraulic driving portion through the hydraulic control valve 1 by the hydraulic pump.

The electromagnetic solenoid 5 according to the disclosure includes a coil 6 which generates magnetic force by energization thereof, a yoke 7 which covers an outer circumference of the coil 6 and extends in an axial direction of the coil 6, stators 8, 9 are arranged around the coil 6 to configure a magnetic circuit together with the yoke 7, a plunger guide 10 which is arranged radially inward of the stators 8, 9 and extends in the axial direction of the coil 6, a plunger 11 inserted into the plunger guide 10, and a collar 12 fitted to an inner circumference of the plunger guide 10 and opposed to the plunger 11 in the axial direction. In a following description, a one side (left side in drawings) of the electromagnetic solenoid 5 in its axial direction is defined as a first side, and the other side (right side in the drawings) of the electromagnetic solenoid 5 in its axial direction is defined as a second side.

The coil 6 is wound around a resin bobbin 13 with a wire. One end of the coil 6 is connected to an electrical terminal 14 which receives electric power from a power source (not shown), and the other end of the coil 6 is connected to the ground through the yoke 7, for example. The electrical terminal 14 is integrated with a resin connector 15 by insert molding. As shown in FIG. 2, the yoke 7 has a step surface 7a at a first-side inner circumferential surface of the yoke 7, and a first part of the yoke 7 at a first side (left side in FIG. 2) of the step surface 7a has a larger inner diameter and a thinner thickness than a second part of the yoke 7 at a second side (right side in FIG. 2) of the step surface 7a. Hereinafter, the first part of the yoke 7 is referred to as a thin first part 7b. As shown in FIG. 1, the yoke 7 is fixed to the sleeve bolt 2 such that an end portion of the thin first part 7b is fastened and fixed to an axial end portion of the sleeve bolt 2.

The stators 8, 9 are provided separately into a first stator 8 arranged at a first side of the coil 6 and a second stator 9 arranged at a second side of the coil 6. As shown in FIG. 2, the first stator 8 includes an annular radial core part 8a and an axial core part 8b. The annular radial core part 8a is arranged perpendicularly to the axial direction (right-left direction in FIG. 2) of the coil 6 so as to extend in a radial direction of the coil 6. The axial core part 8b approximately cylindrically extends to the second side (rightward in FIG. 2) from an inner diametrical end of the radial core part 8a. A core corner part is formed at the intersection portion of the radial core part 8a and the axial core part 8b. An entire outer circumference surface of the core corner part is a corner-cut flat surface (hereinafter, referred to as an outer corner surface 8c) that is inclined from the axial direction by a first angle and is inclined from the radial direction by a second angle. The radial core part 8a is arranged across a spacer 16 in the axial direction from the step surface 7a provided on the inner circumferential surface of the yoke 7. That is, the spacer 16 is inserted between the radial core part 8a and the step surface 7a in the axial direction, and contacts the thin first part 7b of the yoke 7 in the radial direction. An outer circumferential surface of the radial core part 8a and an inner circumferential surface of the thin first part 7b of the yoke 7 define a certain clearance C1 therebetween in the radial direction. The axial core part 8b has a tapered shape, in which its outer diameter decreases gradually toward the second side.

As shown in FIG. 1, the second stator 9 is arranged such that a gap is provided in the axial direction between the second stator 9 and the axial core part 8b of the first stator 8. The gap between the first stator 8 and the second stator 9 is set so that magnetic attraction force is applied between the first stator 8 and the plunger 11 when the coil 6 is energized. The above-described spacer 16 is used as an example of a magnetic member. The spacer 16 has a ring shape and magnetically connects together the yoke 7 and the radial core part 8a. The spacer 16 can be provided as an independent single component, and can be also provided integrally with a bracket 17 of the hydraulic control valve 1 as shown in FIG. 1.

Figure 2:
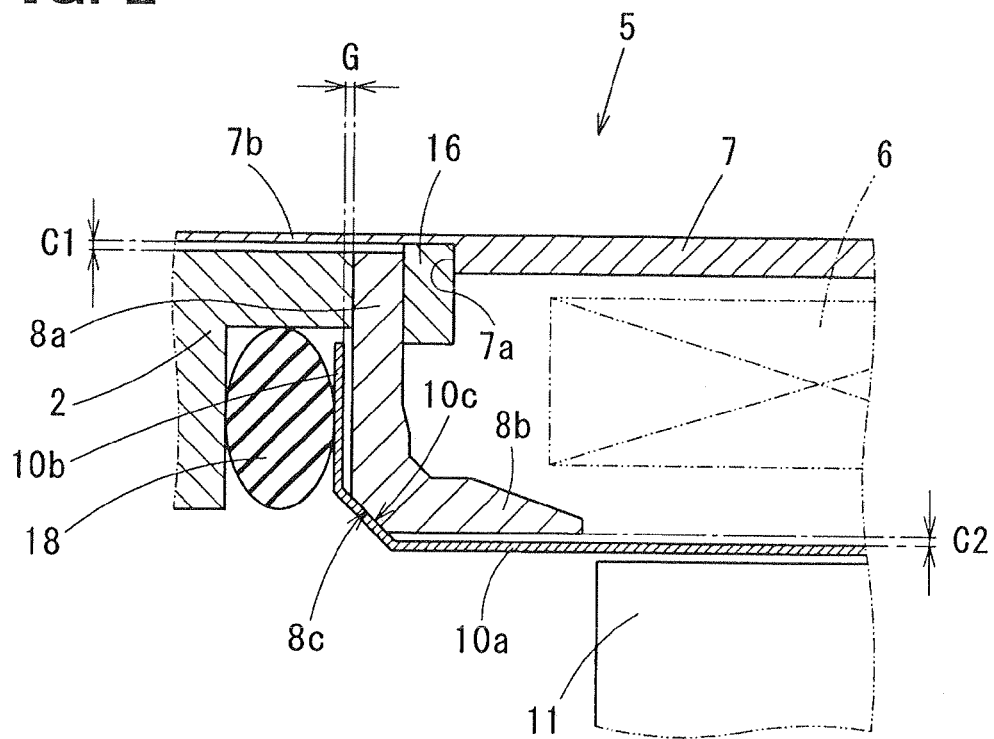
FIG. 2 is a sectional view showing a part of an electromagnetic solenoid in a state in which a first stator is concentric with a plunger guide, according to the first embodiment.

As shown in FIG. 2, the plunger guide 10 includes a cylindrical sleeve 10a which holds an outer circumference of the plunger 11 slidably, and a flange 10b which extends radially outward from one end part of the cylindrical sleeve 10a at the first side. The cylindrical sleeve 10a has a bottomed cylindrical shape, in which the other end part of the cylindrical sleeve 10a has a bottom and the one end part of the cylindrical sleeve 10a has an opening. The cylindrical sleeve 10a is inserted radially inward of first and second the stators 8 and 9 such that a predetermined clearance C2 is provided between an outer circumferential surface of the cylindrical sleeve 10a and inner circumferential surfaces of the stators 8 and 9 in the radial direction. The flange 10b is arranged at a first side (left side in FIG. 2) of the radial core part 8a. A plunger-guide corner part is formed at the intersection portion of the cylindrical sleeve 10a and the flange 10b. An entire inner corner circumference surface of the plunger-guide corner part is a corner-cut flat surface (hereinafter, referred to as an inner corner surface 10c) that is substantially inclined from the axial direction by the first angle and is substantially inclined from the radial direction by the second angle. Therefore, the inner corner surface 10c is substantially parallel with the outer corner surface 8c.

As shown in FIG. 2, an O-ring 18 is arranged between the sleeve bolt 2 and the flange 10b of the plunger guide 10, so that elastic force of the O-ring 18 is applied to an outer surface of the flange 10b of the plunger guide 10, and thereby the inner corner surface 10c is pressed against the outer corner surface 8c. The inner corner surface 10c contacts the outer corner surface 8c in a circular contact portion along an entire circumference. Therefore, the two corner-cut flat surfaces of the first stator 8 and the plunger guide 10 tightly abut on each other. The flange 10b, to which the elastic force of the O-ring 18 is applied, does not contact an outer end surface of the radial core part 8a, and the flange 10b and the radial core part 8a define therebetween a gap G in the axial direction of the coil 6. The O-ring 18 is a sealing component made of rubber, and is fitted to an annular groove provided on the axial end portion of the sleeve bolt 2 on the second side (right side) as shown in FIG. 1. The O-ring 18 seals liquid-tightly between the flange 10b and the sleeve bolt 2.

As shown in FIG. 1, the plunger 11 is provided with a connection portion 11a at one end of the plunger 11 on the first side, and is connected to the spool 3 via the connection portion 11a. The plunger 11 reciprocates in the axial direction within the plunger guide 10 in conjunction with the spool 3. Specifically, when a solenoid circuit is produced by energization of the coil 6, magnetic attraction force acts between the magnetized first stator 8 and the plunger 11. Accordingly, the plunger 11 moves toward the first side of the electromagnetic solenoid 5, and then the plunger 11 stops moving at a position where the magnetic attraction force and reactive force of the coil spring 4 balance with each other. Subsequently, when the energization of the coil 6 is stopped, the magnetic force of the solenoid circuit disappears. Thus, the plunger 11 is pushed back toward the second side of the electromagnetic solenoid 5 by the reactive force of the coil spring 4, and the other end of the plunger 11 thereby contacts the bottom of the cylindrical sleeve 10a and stops. The collar 12 made of magnetic material such as iron is fitted to a first-side inner circumference of the plunger guide 10, and is opposed to the one end of the plunger 11. The collar 12 is magnetized by energization of the coil 6, so that magnetic attraction force is generated between the collar 12 and the plunger 11.

An operation and effects of the first embodiment will be described. In the electromagnetic solenoid 5 of the first embodiment, the outer corner surface 8c of the first stator 8 and the inner corner surface 10c of the plunger guide 10 abut on each other in the circular contact portion in area along the entire circumference, i.e., the corner-cut flat surfaces abut on each other. Accordingly, an axial center of the first stator 8 and an axial center of the plunger guide 10 are coaxially with each other without shifting from each other in a radial direction of the electromagnetic solenoid 5. Because the first stator 8 and the plunger guide 10 can be arranged concentrically, the clearance C2 between the axial core part 8b of the first stator 8 and the cylindrical sleeve 10a of the plunger guide 10 can be kept equal in the radial direction of the electromagnetic solenoid 5, without being lopsided in the radial direction.

Accordingly, center misalignment of the plunger guide 10 and the first stator 8 can be limited, and side force acting upon the plunger 11, when the coil 6 is energized, can be thereby reduced. Thus, when the plunger 11 moves in the plunger guide 10, sliding friction between the plunger 11 and the plunger guide 10 decreases. Therefore, the plunger 11 can move smoothly, and abrasion generated between sliding surfaces, which are an inner circumferential surface of the plunger guide 10 and an outer circumferential surface of the plunger 11, can be reduced. Additionally, in the electromagnetic solenoid 5 of the first embodiment, the flange 10b is urged toward the second side of the electromagnetic solenoid 5 by elastic force of the O-ring 18 used as the sealing component. Thus, another special urging device does not need to be provided. As a result, the number of components can be reduced, and also man-hour for assembly can be reduced. Therefore, cost-cutting can be provided as compared to a case in which another special urging device is required.

Because the flange 10b is urged toward the second side of the electromagnetic solenoid 5, the inner corner surface 10c of the plunger guide 10 is pressed against the outer corner surface 8c of the first stator 8. Thus, the axial center of the first stator 8 and the axial center of the plunger guide 10 can be prevented from shifting from each other in the radial direction of the electromagnetic solenoid 5. The inner corner surface 10c of the plunger guide 10 always abuts on the outer corner surface 8c of the first stator 8 in the contact portion along the entire circumference, so that the center misalignment of the plunger guide 10 and the first stator 8 can be limited.

Furthermore, the clearance C2 between the axial core part 8b of the first stator 8 and the cylindrical sleeve 10a of the plunger guide 10 in the radial direction of the electromagnetic solenoid 5 can be kept equal in the entire circumference. Thus, the clearance C1 between the outer circumferential surface of the radial core part 8a and the inner circumferential surface of the front thin part 7b does not need to be large. Therefore, a clearance C1 necessary for assembly is only required to be provided, and the clearance C1 can be set as small as possible.

The spacer 16 used as the example of the magnetic member is inserted between the radial core part 8a and the step surface 7a in the axial direction, and the yoke 7 and the radial core part 8a are magnetically coupled with each other via the spacer 16. Therefore, in the first embodiment, a magnetic flux is can be transferred successfully between the yoke 7 and the radial core part 8a via the spacer 16 regardless of a size of the clearance C1 in the radial direction.

(Second Embodiment)

Figure 3:
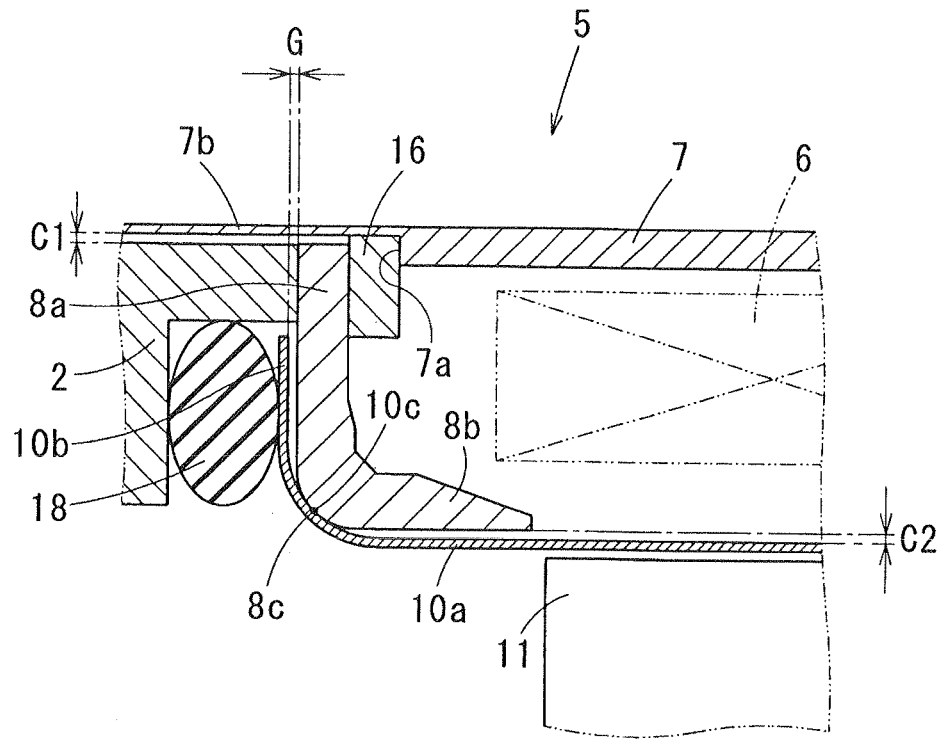
FIG. 3 is a sectional view showing a part of an electromagnetic solenoid in a state in which a first stator is concentric with a plunger guide, according to a second embodiment of the present disclosure.

In an electromagnetic solenoid 5 of a second embodiment, an outer corner surface 8c of a first stator 8 and an inner corner surface 10c of a plunger guide 10 have circular arc surfaces respectively. The electromagnetic solenoid 5 of the second embodiment has the same configuration as the electromagnetic solenoid 5 of the first embodiment except for the above-described components. As shown in FIG. 3, in the second embodiment, the outer corner surface 8c and the inner corner surface 10c have the circular arc surfaces, and a curvature of the circular arc surface of the inner corner surface 10c is larger than a curvature of the circular arc surface of the outer corner surface 8c. In other words, when a radius of the circular arc surface of the outer corner surface 8c is defined as R1 and a radius of the circular arc surface of the inner corner surface 10c is defined as R2, a relationship R1<R2 is satisfied.

In the above-described configuration, the outer corner surface 8c and the inner corner surface 10c, which have the circular arc shapes respectively, contact in a circular contact portion linearly along an entire circumference. Thus, an axial center of the first stator 8 and an axial center of the plunger guide 10 are configured to coincide with each other without shifting from each other in a radial direction of the electromagnetic solenoid 5. Because the outer corner surface 8c and the inner corner surface 10c are different from each other in their curvatures, the corner surfaces 8c and 10c contact in the circular contact portion linearly along the entire circumference as shown by a black dot in FIG. 3. Even in this case, the clearance C2 between the axial core part 8b of the first stator 8 and the cylindrical sleeve 10a of the plunger guide 10 can be kept equal in a radial direction of the electromagnetic solenoid 5, without being lopsided in the radial direction. The clearance C2 may be approximately same in the radial direction as the gap G provided between the flange 10b and the radial core part 8a. In the second embodiment, the other parts of the electromagnetic solenoid 5 are similar to those of the above-described first embodiment.

(Third Embodiment)

Figure 4:
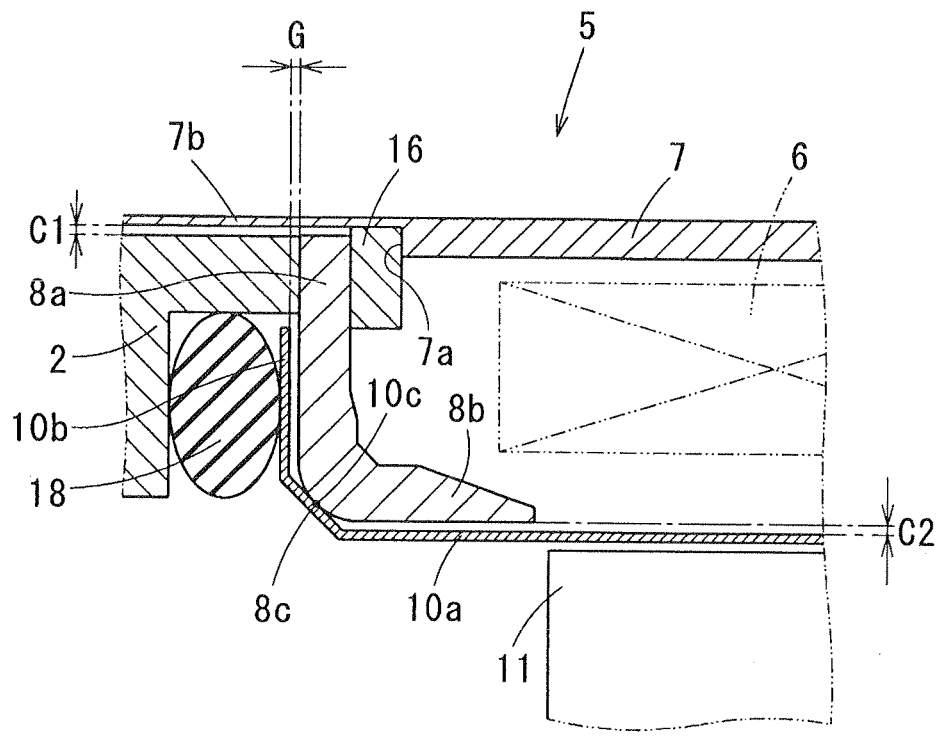
FIG. 4 is a sectional view showing a part of an electromagnetic solenoid in a state in which a first stator is concentric with a plunger guide, according to a third embodiment of the present disclosure.
Figure 5:
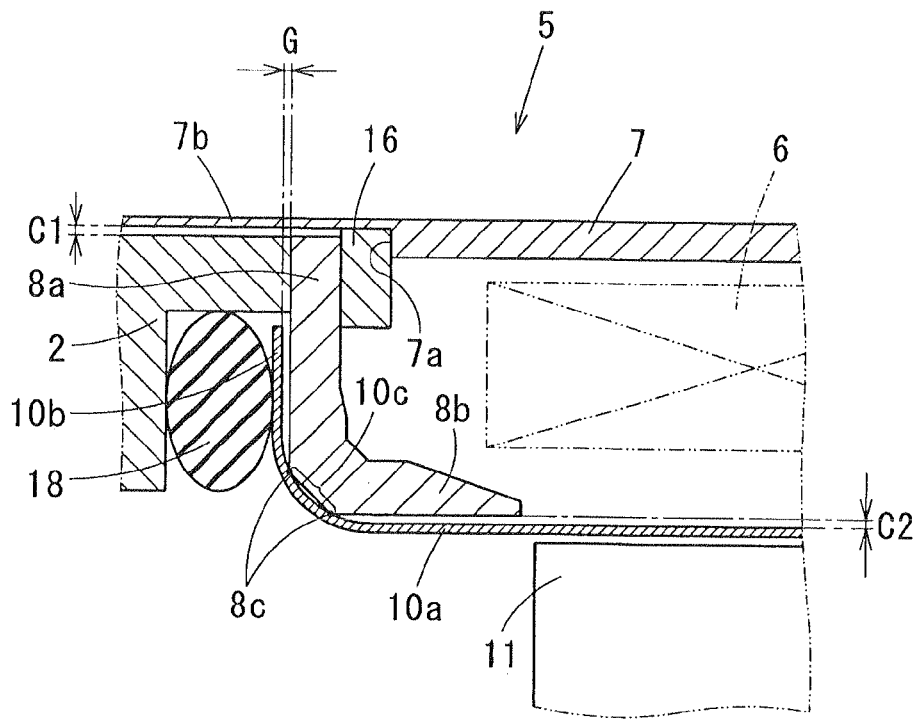
FIG. 5 is a sectional view showing a part of an electromagnetic solenoid in another state in which a first stator is concentric with a plunger guide, according to the third embodiment.

In an electromagnetic solenoid 5 of a third embodiment, one of two surfaces, which are an outer corner surface 8c of a first stator 8 and an inner corner surface 10c of a plunger guide 10, has a corner-cut flat surface and the other one of the two surfaces has a circular arc surface. For example, as shown in FIG. 4, the outer corner surface 8c of the first stator 8 has the circular arc surface, and the inner corner surface 10c of the plunger guide 10 has the corner-cut flat surface. In this case, the outer corner surface 8c and the inner corner surface 10c linearly contact in a circular contact portion on an entire circumference as shown in FIG. 4. Alternatively, in the example shown in FIG. 5, the outer corner surface 8c of the first stator 8 is the corner-cut flat surface, and the inner corner surface 10c of the plunger guide 10 is the circular arc surface. In this case, the outer corner surface 8c having the corner-cut flat surface has two corner edges (edge lines), which contact the inner corner surface 10c having the circular arc surface along two circular lines on entire circumferences as shown by two black dots in FIG. 5.

In the third embodiment, the outer corner surface 8c of the first stator 8 and the inner corner surface 10c of the plunger guide 10 contact in the circular contact portion along the entire circumference, so that an axial center of the first stator 8 and an axial center of the plunger guide 10 coincide with each other without shifting from each other in a radial direction of the electromagnetic solenoid 5. As a result of the above-description, the clearance C2 between the axial core part 8b of the first stator 8 and the cylindrical sleeve 10a of the plunger guide 10 can be kept constant in the entire circumference of the electromagnetic solenoid 5, without being lopsided in the radial direction. In the third embodiment, the other parts of the electromagnetic solenoid 5 are similar to those of the above-described first embodiment.

(Fourth Embodiment)

Figure 6:
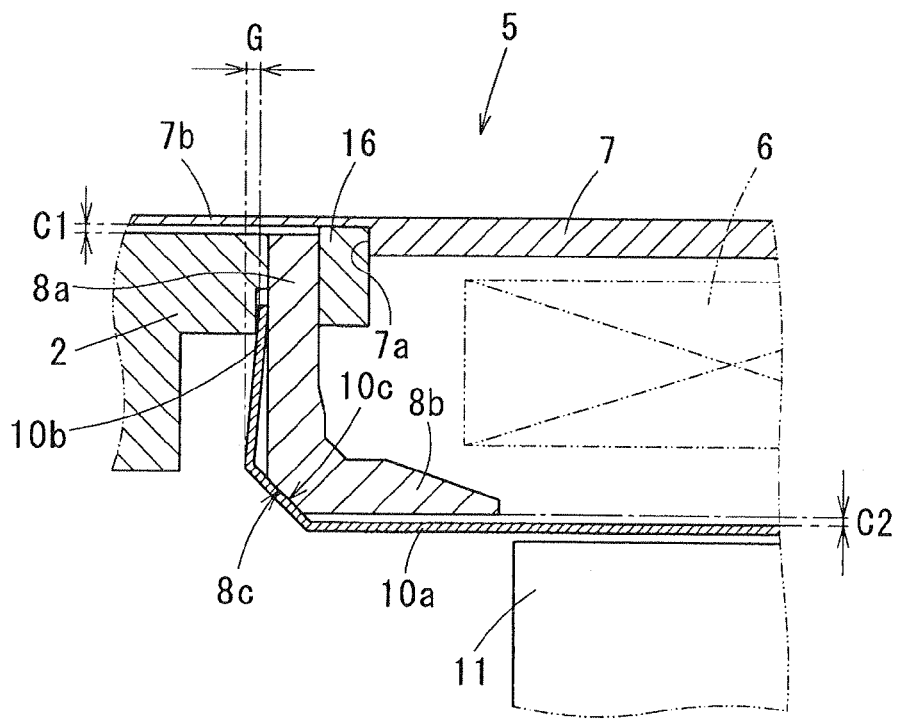
FIG. 6 is a sectional view showing a part of an electromagnetic solenoid in a state in which a first stator is concentric with a plunger guide, according to a fourth embodiment of the present disclosure.

In an electromagnetic solenoid 5 of a fourth embodiment, a flange 10b of a plunger guide 10 is configured to be resiliently deformed. For example, as shown in FIG. 6, an outer diametrical side part of the flange 10b is pressed against the first side of the radial core part 8a with the sleeve bolt 2. Specifically, the outer diametrical side part of the flange 10b is inserted between the axial end portion of the sleeve bolt 2 and the first side of the radial core part 8a, and the flange 10b is thereby resiliently deformed. According to the above-described structure of the flange 10b, the inner corner surface 10c of the plunger guide 10 can be pressed against the outer corner surface 8c of the first stator 8 by utilizing resilient force produced in the resilient deformation of the flange 10b, with respect to the structure shown in FIG. 2 of the first embodiment. As a result, the gap G between the radial core part 8a and the flange 10b gradually decreases in the radial direction.

In this case, a special urging device does not need to be provided, so that the number of components can be reduced. Therefore, cost-cutting can be provided as compared to a case in which the special urging device is required.

The structure of the flange 10b of the fourth embodiment can be used for the electromagnetic solenoid of the second or third embodiments. In the fourth embodiment, as shown in FIG. 6, both the inner corner surface 10c of the plunger guide 10 and the outer corner surface 8c of the first stator 8 have the corner-cut flat surfaces, similar to the first embodiment. However, the structure of the flange 10b of the fourth embodiment can be applied to the configuration of the second embodiment, in which the circular arc surfaces are combined with each other, and to the configuration of the third embodiment, in which the corner-cut flat surface and the circular arc surface are combined with each other. In the fourth embodiment, the other parts of the electromagnetic solenoid 5 are similar to those of the above-described first embodiment.

(Fifth Embodiment)

Figure 7:
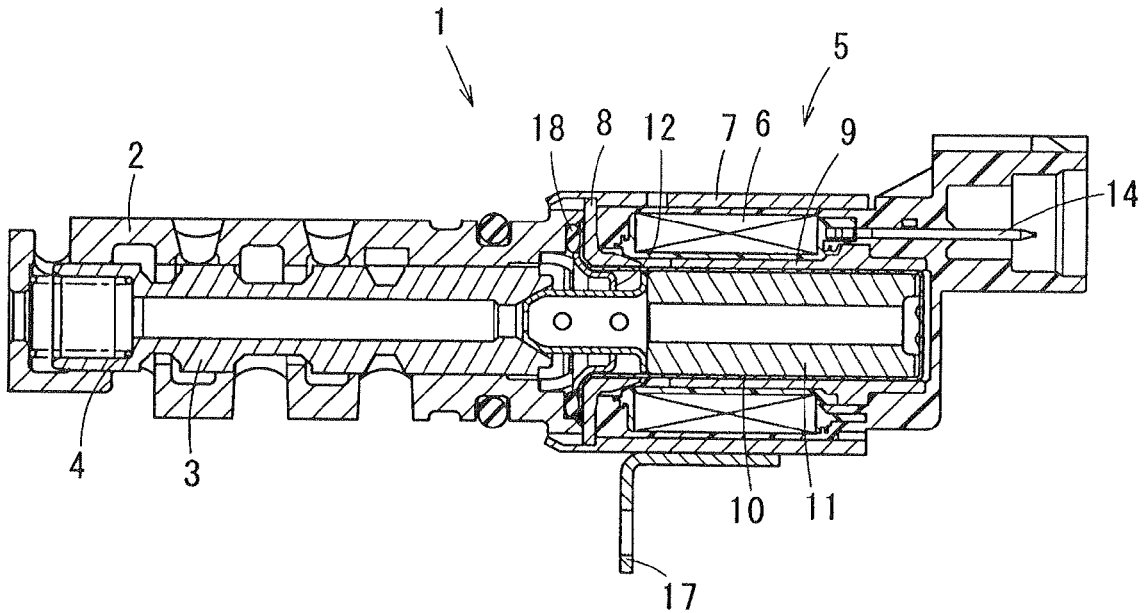
FIG. 7 is a sectional view showing a hydraulic control valve according to a fifth embodiment of the present disclosure.
Figure 8:
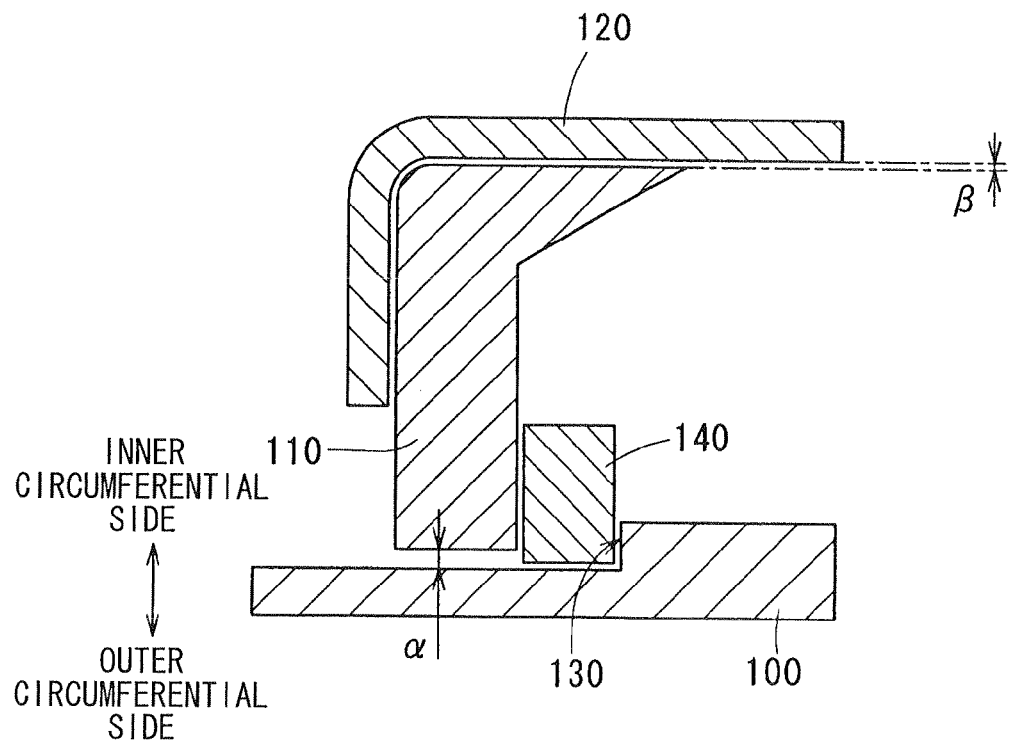
FIG. 8 is a sectional view showing gaps between a stator and a cup guide and between the stator and a yoke in a radial direction of an electromagnetic valve according to a conventional technology.

In an electromagnetic solenoid 5 of a fifth embodiment, as shown in FIG. 7, the spacer 16 described in the first embodiment is eliminated. Even in this case, similarly to the first embodiment, a shift amount between the axial center of the first stator 8 and the axial center of the plunger guide 10 can be reduced. Thus, in the fifth embodiment, the clearance C2 between the axial core part 8b of the first stator 8 and the cylindrical sleeve 10a of the plunger guide 10 can be kept constant in a radial direction of the electromagnetic solenoid 5, so that a magnetic gap (clearance C1) between the yoke 7 and the radial core part 8a does not need to be large. In other wards, the magnetic gap (clearance C1) can be made small.

Hence, even in the fifth embodiment shown in FIG. 7, magnetic flux can transmit successfully between the yoke 7 and the radial core part 8a. Moreover, because the spacer 16 is eliminated, the bracket 17 can be provided separately, and the bracket 17 can be fixed to an outer circumferential surface of the yoke 7 by welding or the like. In the fifth embodiment, the other parts of the electromagnetic solenoid 5 are similar to those of the above-described first embodiment.

Although the present disclosure has been fully described in connection with the preferred embodiments thereof with reference to the accompanying drawings, it is to be noted that various changes and modifications will become apparent to those skilled in the art. For example, in the first embodiment, the flange 10b of the plunger guide 10 is urged by elastic force of the O-ring 18 used as the sealing component. However, the resilient force can be applied to the collar 12 by using the flange 10b. Specifically, as shown in FIG. 1, an outer diametrical side of the collar 12 may be engaged with the flange 10b of the plunger guide 10, and the collar 12 may have lug pieces 12a to have the resilient force. Accordingly, the flange 10b can be urged toward the second side of the electromagnetic solenoid 5 via the collar 12 engaged with the flange 10b.

In the above-described first embodiment, the spacer 16 is formed integrally with the bracket 17 as shown in FIG. 1, but the spacer 16 may be formed separately from the bracket 17. In the above-described first embodiment, the electromagnetic solenoid 5 is typically used for the hydraulic control valve 1 for a valve timing device of an internal combustion engine. However, the electromagnetic solenoid 5 is not limited to the use for the hydraulic control valve 1, and for example, the electromagnetic solenoid 5 may be used for a hydraulic solenoid of a vehicle automatic transmission. Alternatively, the electromagnetic solenoid 5 may be used for an electromagnetic valve which causes a fluid passage or the like to be opened or closed by driving a valve element of the electromagnetic valve.

Additional advantages and modifications will readily occur to those skilled in the art. The disclosure in its broader terms is therefore not limited to the specific details, representative apparatus, and illustrative examples shown and described.

What is claimed is:

1. An electromagnetic solenoid comprising:
   a coil which generates magnetic force by energization;
   a cylindrical yoke covering an outer circumference of the coil and extending in an axial direction of the coil;
   first and second stators which are arranged around the coil to configure a magnetic circuit around the coil together with the yoke, the first and second stators being magnetized by the energization of the coil to configure an electromagnet;
   a plunger guide arranged radially inward of the first and second stators; and
   a plunger inserted into the plunger guide to be slidably movable in the axial direction of the coil and to be attracted by magnetic force of the electromagnet, wherein
   the first stator is arranged at one end side of the coil in the axial direction of the coil, and the second stator is arranged at the other end side of the coil in the axial direction of the coil,
   the first stator includes:
      an annular radial core part arranged perpendicularly to the axial direction of the coil and extending in a radial direction of the coil;
      an axial core part cylindrically extending from an inner diametrical end of the radial core part toward the second stator at a position radially inward of the coil; and
      a core corner part provided at an intersection portion of the radial core part and the axial core part, and having an of outer corner surface, the plunger guide includes:
      a cylindrical sleeve which is arranged radially inward of the first and second stators and extends in the axial direction of the coil to hold the plunger slidably;
      a flange which extends radially outward from an end part of the cylindrical sleeve and is located at a side of the radial core part of the first stator opposed to the coil in the axial direction of the coil; and
      a plunger-guide corner part provided at an intersection portion of the cylindrical sleeve and the flange, and having an inner corner surface, and
   the outer corner surface of the core corner part and the inner corner surface of the plunger-guide corner part abut on each other in a circular contact portion linearly or in area along an entire circumference;
   wherein an inner circumferential surface of the yoke has a step surface that is opposed to a surface of the radial core part on a side of the coil in the axial direction of the coil,
   the step surface and the surface of the radial core part hold a magnetic member therebetween, and
   the yoke and the radial core part are magnetically coupled with each other through the magnetic member.

2. The electromagnetic solenoid according to claim 1, wherein both the outer corner surface of the core corner part and the inner corner surface of the plunger-guide corner part are corner-cut flat surfaces parallel to each other, and contact in the circular contact portion in area along the entire circumference.

3. The electromagnetic solenoid according to claim 1, wherein
   both the outer corner surface of the core corner part and the inner corner surface of the plunger-guide corner part are circular arc surfaces, and
   the inner corner surface of the plunger-guide corner part is larger in curvature than the outer corner surface of the core corner part, and contacts the outer corner surface of the core corner part in the circular contact portion linearly along the entire circumference.

4. The electromagnetic solenoid according to claim 1, wherein
   the flange of the plunger guide and the radial core part define a gap therebetween in the axial direction of the coil, and
   the flange is urged toward the radial core part from a side surface of the flange opposed to the radial core part in the axial direction of the coil.

5. The electromagnetic solenoid according to claim 1, wherein
   the flange of the plunger guide and the radial core part define a gap therebetween in the axial direction, and
   an outer diametrical side part of the flange is pressed from a side of the flange opposed to the radial core part in the axial direction of the coil, and pressed against an end surface of the radial core part, so that the flange is resiliently deformed.

6. An electromagnetic solenoid comprising:
   a coil which generates magnetic force by energization:
   a cylindrical yoke covering an outer circumference of the coil and extending in an axial directional of the coil;
   first and second stators which are arranged around the coil to configure a magnetic circuit around the coil together with the yoke, the first and second stators being magnetized by the energization of the coil to configure an electromagnet;
   a plunger guide arranged radially inward of the first and second stators and
   a plunger inserted into the plunger guide to be slidably movable in the axial direction of the coil and to be attracted by magnetic force of the electromagnet, wherein
   the first stator is arranged at one end side of the coil in the axial direction of the coil, and the second stator is arranged at the other end side of the coil in the axial direction of the coil,
   the first stator includes:
      an annular radial core part arranged perpendicularly to the axial direction of the coil and extending in a radial direction of the coil;
      an axial core part cylindrically extending from an inner diametrical end of the radial core part toward the second stator at a position radially inward of the coil; and
      a core corner part and provided at an intersection portion of the radial core part and the axial core part, and having an of outer corner surface,
   the plunger guide includes:
      a cylindrical sleeve which is arranged radially inward of the first and second stators and extends in the axial direction of the coil to hold the plunger slidably;

a flange which extends radially outward from an end part of the cylindrical sleeve and is located at a side of the radial core part of the first stator opposed to the coil in the axial direction of the coil; and a plunger-guide corner part provided at an intersection portion of the cylindrical sleeve and the flange, and having an inner corner surface, and the outer corner surface of the core corner part and the inner corner surface of the plunger-guide corner part abut on each other in a circular contact portion linearly or in area along an entire circumference;

wherein one of the outer corner surface of the core corner part and the inner corner surface of the plunger-guide corner part is a corner-cut flat surface, and the other one of the outer corner surface of the core corner part and the inner corner surface of the plunger-guide corner part is a circular arc surface, and the outer corner surface of the core corner part and the inner corner surface of the plunger-guide corner part contact in the circular contact portion linearly along the entire circumference.

7. An electromagnetic solenoid comprising:

a coil which generates magnetic force by energization;

a cylindrical yoke covering an outer circumference of the coil and extending in an axial direction of the coil;

first and second stators which are arranged around the coil to configure a magnetic circuit around the coil together with the yoke, the first and second stators being magnetized by the energization of coil to configure an electromagnet;

a plunger guide arranged radially inward of the first and second stators; and a plunger inserted into the plunger guide to be slidably movable in the axial direction of the coil and to be attracted by magnetic force of the electromagnet, wherein the first stator is arranged at one end side of the coil in the axial direction of the coil, and the second stator is arranged at the other end side of the coil in the axial of the coil, the first stator includes:

an annular radial core part arranged perpendicularly to the axial direction of the coil and extending in a radial direction of the coil:

an axial core part cylindrically extended from an inner diametrical end of the radial core part toward the second stator at a position radially inward of the coil; and a core corner provided at an intersection portion of the radial core part and the axial core part, and having an of outer corner surface, the plunger guide includes:

a cylindrical sleeve which extends arranged radially inward of the first and second stator and extends in the axial direction of the coil to hold the plunger sldably;

a flange which extends radially outward from an end part of the cylindrical sleeve and is located at a side of the radial core part of the first stator opposed to the coil in the axial direction of the coil; and a plunger-guide corner part provided at an intersection portion of the cylindrical sleeve and the flange, and having an inner corner surface, and the outer corner surface of the core corner part and the inner corner surface of the plunger-guide corner part abut on each other in a circular contact portion linearly or in area along an entire circumference;

the flange of the plunger guide and the radial core part define a gap therebetween in the axial direction of the coil;

the flange is urged toward the radial core part from a side surface of the flange opposed to the radial core part in the axial direction of the coil; and the side surface of the flange opposed to the radial core part in the axial direction of the coil is coupled with an O-ring, and the flange of the plunger guide is urged toward the radial core part by elastic force of the O-ring.

* * * * *